United States Patent [19]

Morishita et al.

[11] Patent Number: 4,986,381
[45] Date of Patent: Jan. 22, 1991

[54] UNITIZED ELECTRIC POWER STEERING APPARATUS

[75] Inventors: Mitsuharu Morishita; Takeshi Yasukawa, both of Himeji, Japan

[73] Assignee: Mitsubishi Denki Kabushiki Kaisha, Tokyo, Japan

[21] Appl. No.: 368,633

[22] Filed: Jun. 20, 1989

[30] Foreign Application Priority Data

Jul. 14, 1988 [JP] Japan .................. 63-177943

[51] Int. Cl.$^5$ ............................... B62D 5/04
[52] U.S. Cl. .................................. 180/79.1
[58] Field of Search ....................... 180/79.1

[56] References Cited

U.S. PATENT DOCUMENTS

| | | | |
|---|---|---|---|
| 2,534,536 | 12/1950 | Staude | 180/79.1 |
| 4,448,275 | 5/1984 | Kitagawa et al. | 180/79.1 |
| 4,651,840 | 3/1987 | Shimizu et al. | 180/79.1 |
| 4,660,671 | 4/1987 | Behr et al. | 180/79.1 |
| 4,666,010 | 5/1987 | Morishita et al. | 180/79.1 |
| 4,724,917 | 2/1988 | Naito et al. | 180/79.1 |
| 4,726,437 | 2/1988 | Norton | 180/79.1 |
| 4,753,310 | 6/1988 | Hashimoto | 180/79.1 |
| 4,865,143 | 9/1989 | Hashimoto et al. | 180/79.1 |

FOREIGN PATENT DOCUMENTS 0285177 10/1988 European Pat. Off. .
3106088 9/1982 Fed. Rep. of Germany .

Primary Examiner—Mitchell J. Hill
Attorney, Agent, or Firm—Sughrue, Mion, Zinn, Macpeak and Seas

[57] ABSTRACT

A unitized electric power steering apparatus has a main housing which contains a speed reducer and a torque sensor. An electric motor which drives the speed reducer and a motor controller which controls the electric motor are mounted on the outside of the main housing to protect them from thermal damage.

3 Claims, 3 Drawing Sheets

UNITIZED ELECTRIC POWER STEERING APPARATUS

BACKGROUND OF THE INVENTION

This invention relates to a power steering apparatus for an automobile which can be easily assembled and installed and which has good heat resistance.

Recently, unitized power steering devices for automobile have been developed. These devices include an electric motor, a speed reducer, a torque sensor, and a motor controller on a circuit board, all enclosed within a single sealed housing. Such power steering devices are extremely compact and can be easily installed on the end of a steering shaft. A unitized power steering device of this type is disclosed in Japanese Published Unexamined Patent Application No. 60—234069.

However, because the electric motor and the motor controller are sealed inside the housing, it is difficult to cool them, and they can easily suffer from thermal damage.

SUMMARY OF THE INVENTION

Accordingly, it is the object of the present invention to provide a unitized electric power steering apparatus which is constructed so that the electric motor and the motor controller thereof do not suffer from thermal damage.

A unitized electric power steering apparatus in accordance with the present invention includes a main housing, a torque sensor and a speed reducer which are contained within the main housing, and an electric motor and a motor controller which are mounted on the outside of the main housing. Because the electric motor and the motor controller are disposed on the outside of the main housing, they can be adequately cooled, and there is no danger of them suffering from thermal damage during operation.

BRIEF EXPLANATION OF THE DRAWINGS

In the FIGURES, the same reference numerals indicate the same or corresponding parts.

DESCRIPTION OF THE PREFERRED EMBODIMENT

Figure 1:
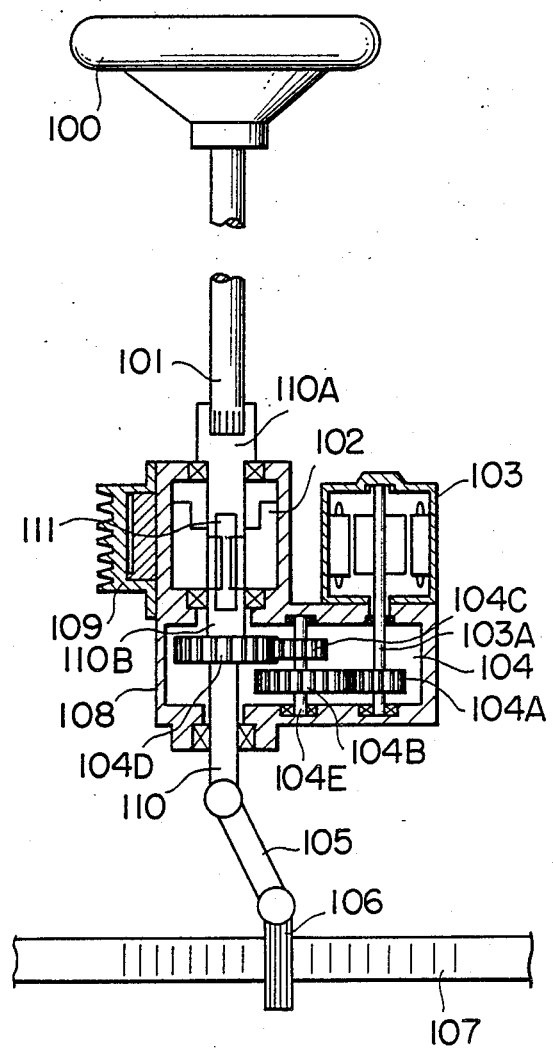
FIG. 1 is a cross-sectional view of an embodiment of a power steering apparatus according to the present invention.

Hereinbelow, a preferred embodiment of the present invention will be described while referring to the accompanying drawings. FIG. 1 is a cross-sectional view of this embodiment as it would appear when mounted on an automobile. As shown in this FIGURE, a main housing 108 encloses a torque sensor 102 and a speed reducer 104. An electric motor 103 and a motor controller 109 are mounted on the outside of the main housing 108 and are separated from one another. Both the motor 103 and the controller 109 are enclosed in their own individual housings which are secured to the main housing 108. As seen in FIG. 1, the controller housing is provided with cooling fins. The motor 103 has an output shaft 103A which extends into the main housing 108 and is rotatably supported by the walls thereof. The speed reducer 104, which includes spur gears 104A–104D, transmits the rotation of the motor 103 to a connecting shaft 110. A first stage gear 104A is secured to the output shaft 103A of the motor 103 and meshes with a first countershaft gear 104B which is secured to a countershaft 104E which is rotatably supported by the walls of the main housing 108. A second countershaft gear 104C which is secured to the countershaft 104E meshes with an output gear 104D. The connecting shaft 110 is a two-piece shaft comprising an input section 110A and an output section 110B, both of which are rotatably supported by the main housing 108. The output gear 104D is secured to the output section 110B of the connecting shaft 110. The input section 110A and the output section 110B are connected with one another by a torsion bar 111 which undergoes twisting deformation when transmitting torque from one section to the other. The torsion bar 111 is surrounded by a torque sensor 102 which detects the twisting deformation of the torsion bar 111 and generates an electrical output signal corresponding to the magnitude of the deformation. Any conventional type of torque sensor can be employed, such as one which detects twisting deformation by optical or electrical means. The motor controller 109 is mounted on the outside of the main housing 108 adjacent to the torque sensor 102.

The input section 110A of the connecting shaft 110 is connected to the serrated end of a steering shaft 101 on whose other end a steering wheel 100 is mounted. The output section 110B of the connecting shaft 110 is connected to a pinion 106 through a universal joint 105. The pinion 106 meshes with a rack 107 of a steering gear, which is connected to the unillustrated front wheels of the automobile by a conventional steering linkage.

Figure 2:
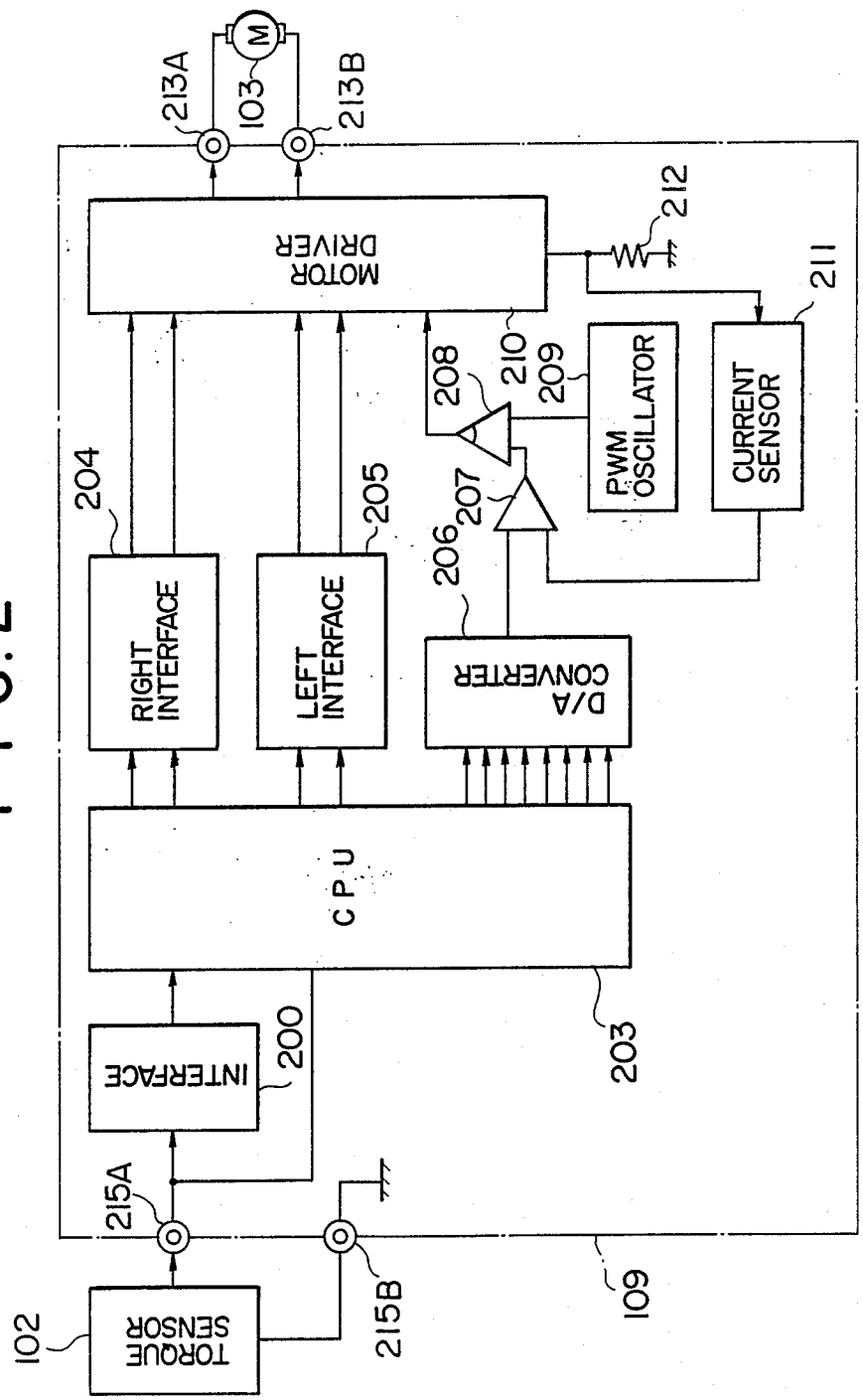
FIG. 2 is a block diagram of the motor controller of the embodiment of FIG. 1.

FIG. 2 is a block diagram of the motor controller 109 of the embodiment of FIG. 1. The output signal of the torque sensor 102 is input to a CPU 203 of the motor controller 109 via an input port 215A and a torque signal interface circuit 200. The torque sensor 102 is grounded via a ground terminal 215B. Based on the magnitude of the torque signal from the torque sensor 102, the CPU 203 determines the direction in which the motor 103 should rotate. The CPU 203 outputs a right turn drive signal or a left turn drive signal which is input to a motor driver 210 via a right turn interface circuit 204 or a left turn interface circuit 205, respectively. The motor 103 is driven by the motor driver 210, which is connected to the motor through output terminals 213A and 213B.

The CPU 203 also outputs a digital torque signal which indicates the magnitude of torque to be generated by the motor 103. The torque signal is converted into an analog signal by a D/A converter 206, and the analog output signal of the D/A converter 206 is input to the first input terminal of an error amplifier 207.

The current flowing through the motor 103 is detected by measuring the voltage across a current sensing resistor 212 which is connected between the motor driver 210 and ground. The voltage across the resistor 212 is input to a current sensor 211, which controls the level of the motor current and can cut off the supply of current to the motor 103. The current sensor 211 generates an output signal which is input to the second input terminal of the error amplifier 207. The output signal of the error amplifier 207 is input to one input terminal of a comparator 208. The other input terminal of the comparator 208 receives the output signal of a reference oscillator 209 for pulse width modulation. The comparator 208 modulates the output signal of the error amplifier 207 in accordance with the output signal of the reference oscillator 209 and generates a control signal having a pulse width which is proportional to the magnitude of the output signal of the torque sensor 102. This output signal is input to the motor driver 210.

Figure 3:
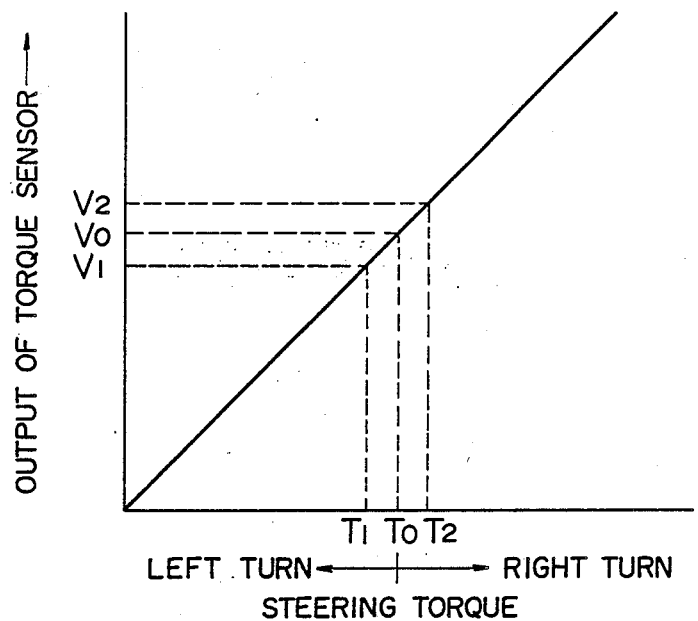
FIG. 3 is a graph of the output characteristics of the torque sensor of FIG. 2 as a function of steering torque.

FIG. 3 illustrates an example of the output voltage of the torque sensor 102 as a function of the torque applied to the steering wheel 100, which will be referred to as the steering at which no torque is applied to the steering wheel 100. A value torque. Point $T_o$ on the horizontal axis indicates a neutral point to the right of this point on the horizontal axis indicates steering torque for a right turn and a value to the left of this point indicates steering torque for a left turn. T1 and T2 are threshold torques for power steering to the left and right, respectively, and define a dead band of control. When the steering torque is between T1 and T2, power steering does not take place.

When the steering torque is $T_0$, T1, or T2, the torque sensor 102 produces an output voltage V0, V1, or V2, respectively. Within the range of control, the output voltage of the torque sensor 102 is nearly linear with respect to the detected steering torque.

Figure 4:
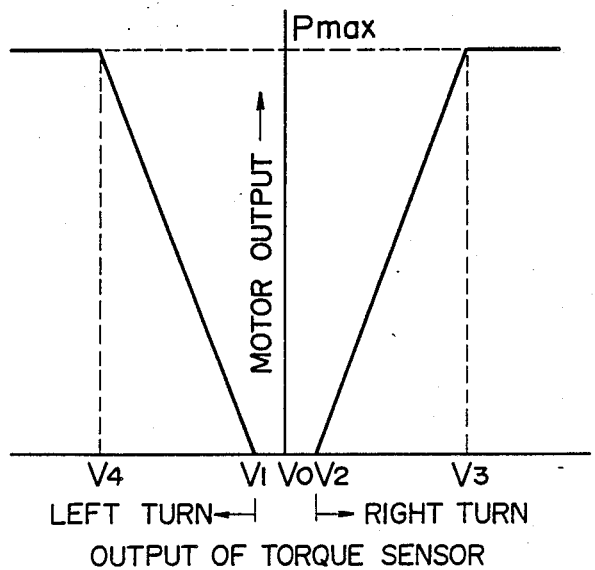
FIG. 4 is a graph of the output characteristics of the electric motor of FIG. 2 as a function of the output voltage of the torque sensor.

FIG. 4 illustrates one example of the output characteristics of the motor 103. The horizontal axis shows the value of the output voltage of the torque sensor 102 and the vertical axis shows the output of the motor 103.

When the output voltage of the torque sensor 102 is between V1 and V2, the motor 103 does not operate; this is the dead band referred to earlier. When the output voltage of the torque sensor 102 is between V2 and a higher voltage V3, the motor 103 exerts a torque on the connecting shaft 110 which steers the wheels of the automobile to the right, the torque increasing linearly with the output voltage until it reaches a maximum value Pmax. Similarly, when the output voltage of the torque sensor 102 is between V1 and a lower voltage V4, the motor 103 exerts a torque on the connecting shaft 110 which steers the wheels of the vehicle to the left, the torque increasing linearly as the output voltage decreases until the motor output reaches the maximum Pmax. For an output voltage of greater than V3 or less than V4, the motor output remains constant at Pmax. The output characteristics are symmetrical about a vertical line passing through V0.

When a steering torque having a magnitude outside the dead band is applied to the steering wheel 100, the electric motor 103 generates a torque which is linearly proportional to the steering torque up to a maximum value of Pmax. The motor torque is transmitted from the motor 103 to the output section 110B of the connecting shaft 110 through the speed reducer 104, and the speed reducer multiplies the motor torque so that the torque applied to the output section 110B is much greater than the torque applied to the input section 110A of the connecting shaft 110. The output section 110B then steers the wheels of the vehicle through the steering gear and the unillustrated steering linkage. As a result, the vehicle can be easily steered with only a small steering torque being imparted to the steering wheel 100 by the driver.

In accordance with the present invention, since the motor 103 and the motor controller 109 are mounted on the outside of the main housing 108, they can be adequately cooled and do not suffer from thermal damage. In addition, as the entire steering apparatus is unitized, it can be easily installed between the steering shaft and the steering gear of a vehicle.

What is claimed is:

1. A unitized electric power steering apparatus for an automotive vehicle, comprising:
   a closed main housing (108);
   an electric motor (103) mounted on an outside of said main housing;
   a rotatable input member (110A) rotatably supported by said main housing and connected to a steering shaft (101) of the vehicle so that a steering torque is applied to said rotating input member when the steering shaft is rotated;
   a torque sensor (102) disposed inside said main housing for sensing the magnitude and direction of the steering torque applied to the rotating input member.
   a rotating output member (110B) supported by said main housing and connected to a steering gear (106) of the vehicle to transmit a steering torque to the steering gear;
   a speed reducer (104) disposed inside said main housing and connected between said electric motor and said rotating output member to transmit the rotation of said electric motor to said rotating output member at a reduced speed; and
   a motor controller (109) mounted to the outside of said main housing, physically separated from the electric motor and disposed remote therefrom, for controlling the operation of said motor in accordance with the torque sensed by said torque sensor, wherein the motor controller is disposed within a separate housing therefor, and wherein said separate housing is provided with cooling fins.

2. A unitized electric power steering apparatus as claimed in claim 1, wherein said rotating input member and rotating output members are coaxial shafts, further comprising a torsion bar (111) which connects said coaxial shafts with one another.

3. A unitized electric power steering apparatus as claimed in claim 2, wherein said torque sensor comprises means for sensing twisting deformation of said torsion bar.

* * * * *